_United States Patent Office_ 3,829,341
Patented Aug. 13, 1974

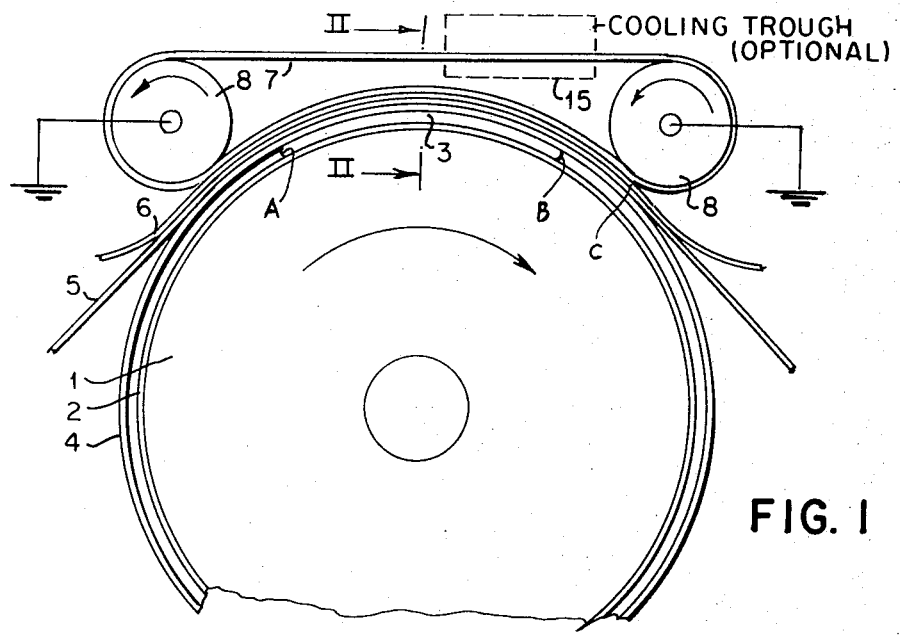
FIG. 1
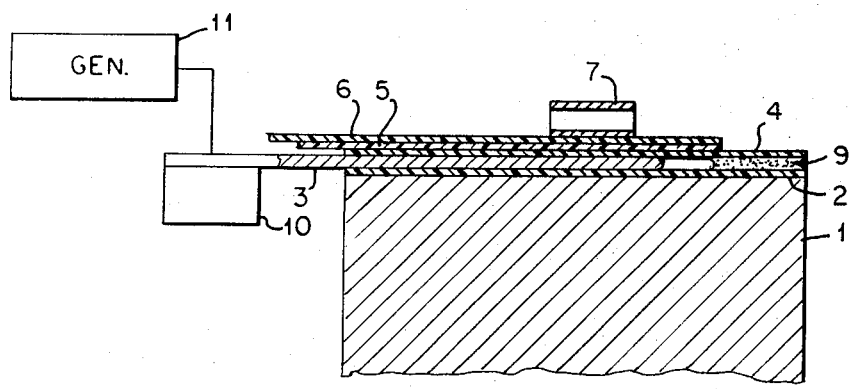
FIG. 2
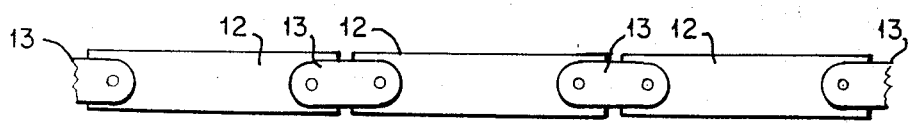
FIG. 3A
FIG. 3B
FIG. 3C
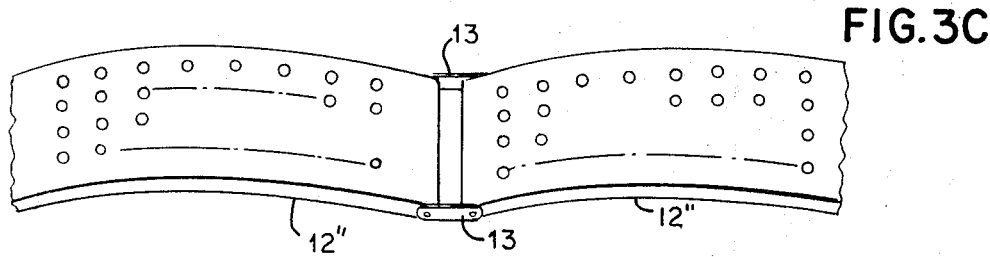

3,829,341
DIELECTRIC SEALING APPARATUS
Milton Rothstein, East Williston, Martin Kaplan, Oceanside, and Lloyd Barton, Hauppauge, N.Y., assignors to Solidyne, Inc., Brooklyn, N.Y.
Filed Oct. 13, 1972, Ser. No. 297,305
Int. Cl. B29c 19/02
U.S. Cl. 156—380                                40 Claims

ABSTRACT OF THE DISCLOSURE

A dielectric heat sealing apparatus includes a rotatable drum and a drum buffer spaced from, and at least partially axially overlaying the circumference of said drum, the buffer being attached to the drum to rotate therewith. The buffer and drum surface are preferably made of slippery, insulating materials, such as polytetrafluoroethylene-impregnated fiberglas. A metallic electrode is interposed in the space between the drum buffer and the drum surface, and a movable metallic belt is pressed against the drum buffer over a predetermined portion thereof to press a workpiece which is to be sealed between the metallic belt and the drum buffer. Upon application of radio frequency voltage between the belt and metallic electrode, the workpieces are dielectrically heated to seal same.

---

The present invention relates to dielectric sealing apparatus, and more particularly, to a dielectric heat sealing apparatus for more efficiently feeding the material being sealed and cooling the material while under pressure.

In dielectric heat sealing, it is necessary to heat the material being sealed, and to then cool it under pressure. However, the continuous seaming or sealing devices using drums, rollers or wheels, and belts, available up until now, have not had adequate means for cooling under pressure and/or do not exhibit good mechanical life. Among the prior art devices is that disclosed in U.S. Pat. No. 3,162,561, to R.D. Farkas.

The main object of the present invention is to provide a new continuous dielectric sealing apparatus which is capable of developing adequate dielectric heat in the materials to be seamed or sealed, capable of providing adequate cooling under pressure, and has a simple mechanical construction which will exhibit good mechanical life under long use.

SUMMARY OF THE INVENTION

In accordance with the present invention, a dielectric heat sealing apparatus comprises a drum, a drum buffer spaced from and at least partially axially overlaying the circumference of the drum means for rotating the drum buffer about the axis of the drum, therewith, and a metallic electrode interposed in the space between the drum buffer and the outer surface of the drum. Further provided is a movable metallic belt which is pressed against the drum buffer over a predetermined portion thereof to press a workpiece to be sealed between the metallic belt and the drum buffer. Radio frequency voltage is applied between the metallic belt and metallic electrode to effect sealing.

Preferably, the surface of the drum, and the drum buffer, are fabricated of a slippery, insulating material, such as teflon-impregnated fiberglas. The drum and buffer may be connected together for concurrent rotation, or the drum may be held stationary and only the drum buffer rotated.

BRIEF DESCRIPTION OF THE DRAWINGS

FIG. 1 is a cross-sectional view of an embodiment of the present invention in simplified form, omitting equipment which is not germane to the invention being claimed;

FIG. 2 is an enlarged sectional view of a portion of the apparatus of FIG. 1 taken along the line II-II;

FIGS. 3A-3C illustrate various belts for use in the present invention;

DETAILED DESCRIPTION OF PREFERRED EMBODIMENTS

Figure 4:
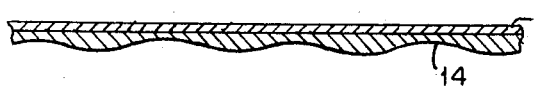
FIG. 4 illustrates another embodiment of a belt.

Throughout the Figures, line drawings are used for the sake of clarity, and corresponding elements are given the same reference numerals.

Referring to FIG. 1, there is shown a cross-sectional view of the main constitutent elements of an embodiment of the present invention. The rotatable drum 1 of the present invention is preferably a non-metallic drum which has a slippery surface, the slippery surface being integral with the drum or being provided as a separate element fastened to the drum. In FIG. 1, the drum 1 is shown having a cover 2 of slippery material superposed thereon. The cover 2 is fabricated of, for example, polytetrafluoroethylene impregnated fiberglas. A buffer layer 4, for example made of polytetrafluoroethylene impregnated fiberglas, surrounds the cover 2 of the drum and also has a slippery surface. The buffer 4 is fastened to the drum to rotate therewith and is spaced from the cover 2 of the drum over a portion thereof. In FIGS. 1 and 2 the buffer 4 is shown co-extensive with, and entirely surrounding cover 2 of the drum. However, buffer 4 need not be co-extensive with the drum in the axial direction of the drum 1, as long as it is wide enough so that the sealing portions of the work material passes thereover.

Interposed between the buffer 4 and cover 2 of the drum is an electrode 3, made of thin sheet metal, such as brass or phosphor bronze. The electrode 3 may rest on the slippery surface of drum cover 2. FIG. 2 shows in more detail the spacing between the buffer 4 and cover 2, and the interposition of electrode 3 therebetween.

Referring to FIG. 2, the buffer 4 is fastened to the drum beyond the edge of the electrode 3 by means of for example, adhesive 9. Double-faced self-adhesive tape, a clamp, or any other suitable fastening means may be used. The electrode 3 is held stationary by a mechanical support 10 which does not rotate with the drum 1.

In FIGS. 1 and 2, the materials being sealed are referred to as the work materials 5 and 6. One, two, or several layers of material may be treated, as desired. A metal belt or band 7 is held between wheels 8, the wheels 8 rotating to allow the metal belt 7 to move in the same direction as the peripheral surface of the rotatable drum 1 during operation. The wheels 8 may be metallic or non-metallic. Metallic wheels are preferred since they can absorb more heat than non-metallic wheels. The heat absorption characteristics are further enhanced if the wheels 8 are water cooled. The springs, air or hydraulic cylinders, and the like, which are used to press the wheels 8 toward the drum and to apply pressure to the belt 7 in order to squeeze the belt 7 against the work and drum are not shown for the sake of clarity and so as not to unduly obscure the present invention. In a typical embodiment, for example, the belt 7 may be of stainless steel or other metal, approximately 0.02 in. thick. Such springs, cylinders and the like which cooperate with wheels 8 and belt 7 are generally disclosed, for example, in U.S. Pat. No. 3,162,561.

As the drum 1 rotates during use, the workpieces 5 and 6 are pulled between the buffer 4 and the belt 7 and are carried over the electrode 3. High frequency voltage, such as radio frequency, is applied between the belt 7 and the stationary electrode 3, by means, for example, of generator 11 (see FIG. 2). Wheels 8 are grounded and electrode 3 is insulatingly mounted to insure proper electrical performance. FIG. 2 shows the belt 7 grounded via the grounded wheels 8, and the voltage source connected to the electrode 3. It should be clear, however, that the high frequency voltage may be applied between the electrode 3 and belt 7 by connecting the high frequency generator to the belt 7 (such as via the wheels 8) and by grounding the electrode 3. This voltage which is applied across the work between belt 7 and electrode 3, dielectrically heats the workpieces as they move between points A and B (see FIG. 1). As the workpieces 5 and 6 move beyond point B, they continue to be pressed against the drum by the belt 7, thus providing pressure while the material cools by dissipating its heat to the metallic belt 7 and to the drum. At point C (FIG. 1) the metallic belt 7 moves away from the drum 1 and around wheel 8, thus releasing the pressure on the work after the work has cooled sufficiently to provide the desired seam.

By properly choosing the length of the electrode 3 from point A to point B, and the length of the cooling space from point B to point C, and by adjusting the voltage applied and the speed of rotation of the drum 1, the workpieces reach the proper melting temperature for fusion by the time they leave point B, and are cooled sufficiently in the space from point B to point C so that the materials are properly fused by the time the pressure is released at point C.

The advantage of the present device lies in its simplicity of construction and the consequent reliability and long life of the constituent elements. The metal belt 7 will have a virtually unlimited life if the wheels 8 are large enough to prevent fatigue in the metal belt 7 as it passes around the wheels. Since the buffer layer 4 can be fastened to the drum outside of the pressure area (see FIG. 2), the fastening point is not subject to excessive strain in use. The buffer 4 and the drum cover 2 are fabricated from a material which is easily slideable with very low friction around the stationary electrode 3, and this is the only area in the device of the present invention in which wear will take place. However, the wear on the electrode 3, buffer 4 and the drum cover 2 is minimal because of the extreme slippery nature of the materials used for the drum cover 2 and the buffer 4—preferably polytetrafluoroethylene impregnated Fiberglas. This material has been used for a number of years as a sliding-wear surface in many different machinery applications with great success.

A modified belt for certain application could be segmented, that is, made up of short length sections 12 connected in chain form by links 13 as shown in FIG. 3A or connected by a continuous element 13a of fabric, metal, etc., as shown in FIG. 3B. The connected sections 12 could have curved faces as shown in FIG 3C to match the curvature of the drum 1, or could have flat faces, FIGS. 3A and 3B, if they are short enough. It is sometimes required to seal materials with contoured profiles. In such a case, the belt segments might be curved to match the profile of the plastic being fed through the machine, in addition to having the curved shape to conform to the drum surface curvature.

In certain instances the belt 7 or the belt segments of FIGS. 3A–3C may be embossed with a pattern which is to be impressed upon the plastic being sealed. In simplest form, a pattern of holes (such as round, square, diamond-shaped, etc.) could be punched in the belt to impart a pattern comprising a series of dots on the surface of the plastic being sealed.

As shown in FIG. 4, the belt 7 or belt-segments 12 might be coated or covered on its work contacting side with non-metallic material 14 such as polytetrafluoroethylene, silicone rubber, etc. The non-metallic covering 14 may be needed in certain applications to provide thermal insulation between the belt and the plastic being sealed. Thermal insulation is useful when sealing thin materials; it reduces the power required for such sealing. The non-metallic covering 14 also provides electrical insulation which allows a higher voltage to be used to make the machine run faster. It also helps in sealing materials which have low voltage-breakdown points.

The optional covering 14 for the belt 7 or belt-segments 12 could be made of patterned material. In conventional processes, silicone rubber molds are formed to reproduce many different types of surface decorations, such as leather grains, linen finishes, stitching effects, etc. Similar mold making techniques can be used to form the covering 14 of the belt 7, thus enabling the covered belt to imprint a pattern on the plastic being sealed or heated. The advantage of the silicone rubber covering the belt is that it is very inexpensive to form the pattern, whereas embossing the metal belt itself may be costly.

As mentioned above, the wheels 8 that carry the belt 7 may be water cooled. The belt 7 itself may alternatively or additionally be water cooled. If the belt 7 is composed of belt segments 12, each segment can have a water cooling passageway in it, and a water supply may be connected thereto by means of rotating water joints, which are commonly available devices. A continuous thin metal belt or the segmented belt may be water cooled by having a portion of it move through a trough 15 that is filled with water or other cooling medium, as illustrated for example in FIG. 1.

Figure 5:
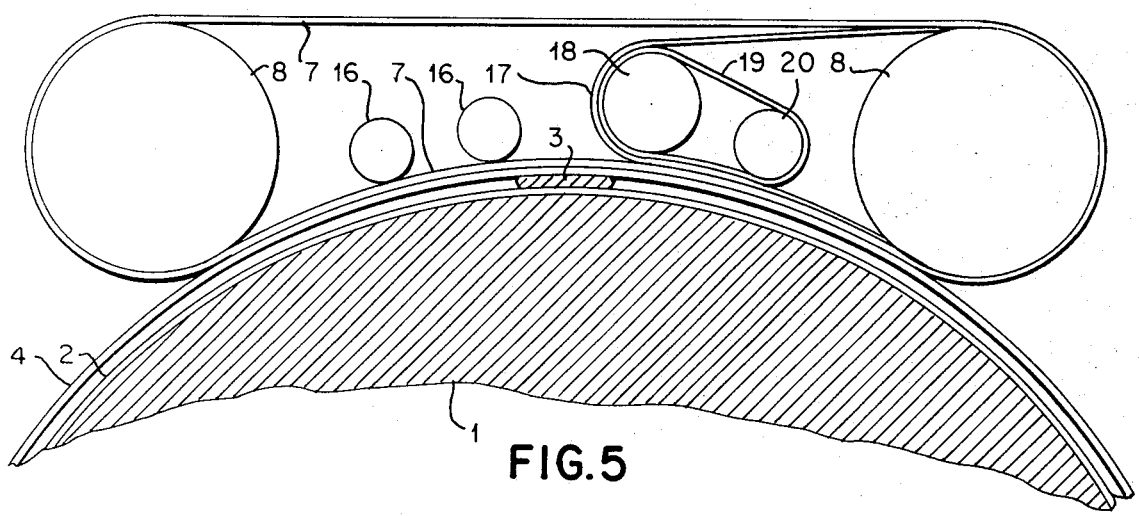
FIG. 5 illustrates an arrangement to provide varied pressure on the metallic belt.

In some applications it may be desirable to subject the material being heated to different pressures at different points or zones along the periphery of the drum 1. Examples of how to apply such different pressures are shown in FIG. 5. The basic belt 7 is shown as a solid line. Pressure rollers are shown at 16. The pressure rollers 16 will apply point pressure. An additional belt 17 shown by a dashed line is held in place by an additional roller 18. Belt 17 will apply pressure over a portion of the surface of the drum, said portion ending at the same point as the end of the pressure-area of the basic belt 7. This is obtained by having the basic belt 7 and the additional belt 17 move around a common wheel 8. Another variation may be obtained adding the belt 19 which is carried by roller 18 and a still further roller 20. The various belts 17 and 19 and rollers 16, 18 and 20 may be provided in any combination as required by the system design and type of sealing.

Figure 6:
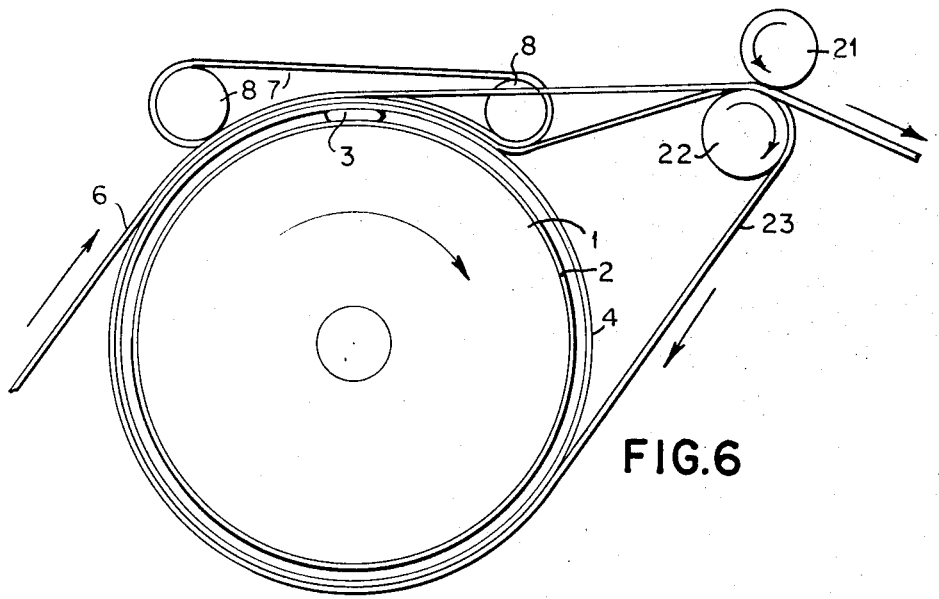
FIG. 6 illustrates an arrangement for removing processed material from the drum.

Certain materials do not fall off the drum easily after they are processed. To carry them away an auxiliary set of long rollers 21 and 22 as shown in FIG. 6, is provided. Rollers 21 and 22 extend preferably transversely of the material being processed (i.e., in parallel with the axis of the drum) and may be independently driven or may be driven from the basic drum 1 by means of another belt 23. Belt 23 is positioned on the drum 1 in an area where it does not interfere with the processing of the material. The material, after processing, is carried between the auxiliary rollers 21 and 22 away from the drum.

Figure 7:
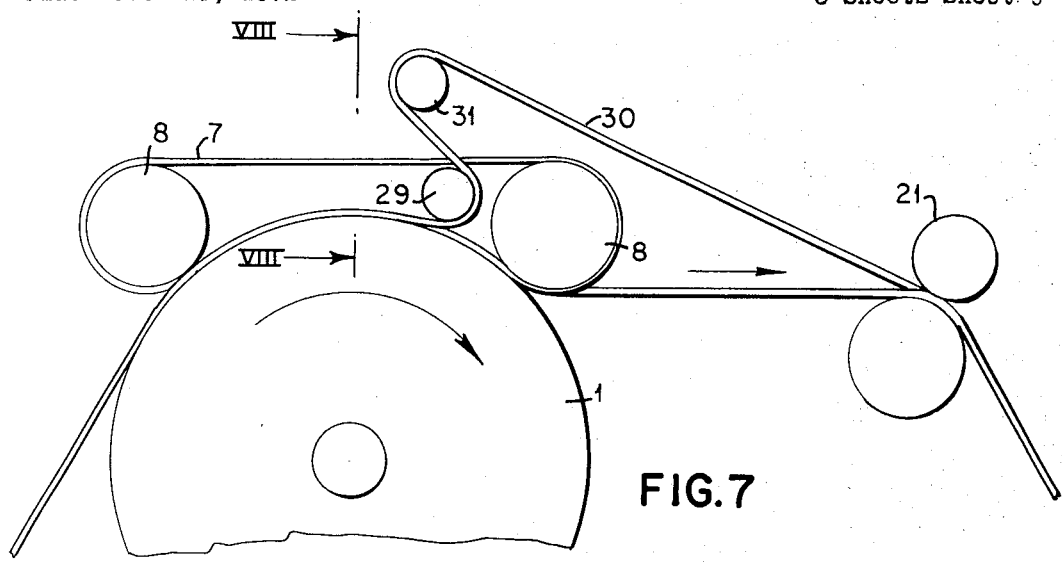
FIG. 7 illustrates an arrangement for removing unwanted material from the material being processed.
Figure 8:
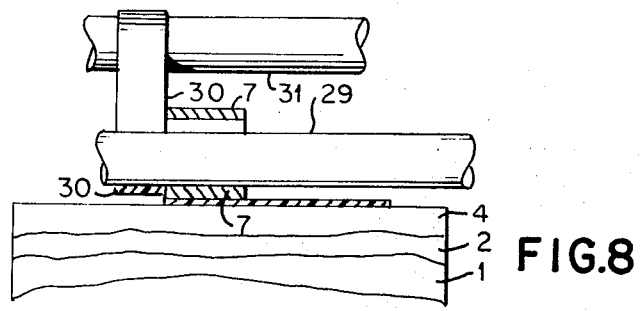
FIG. 8 is a view along the lines VIII—VIII in FIG. 7.
Figure 9:
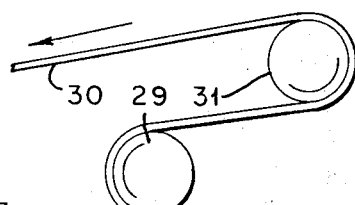
FIGS. 9 and 10 are enlarged partial side and top views, respectively, of the arrangement of FIGS. 7 and 8.
Figure 10:
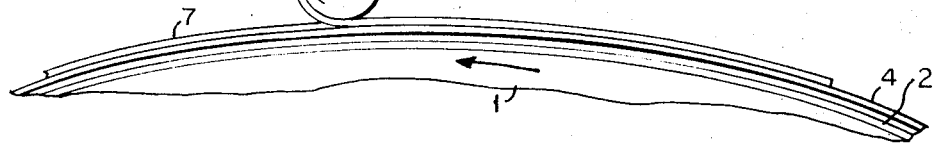
Figure 10:
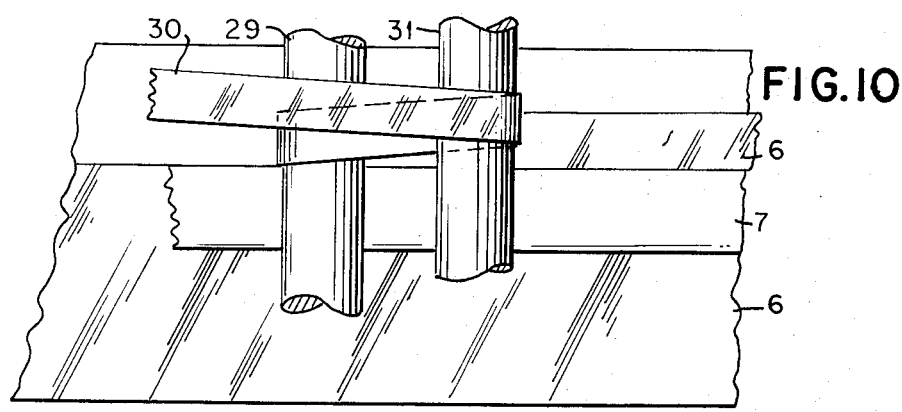

In heat sealing it is sometimes required to tear away the unfinished edge of a processed part. This can be done continuously with the embodiment shown in FIGS. 7–10. FIG. 7 shows the profile view of the embodiment. The materials being processed are run through normally, and the unwanted portion 20 is shown being drawn away over rollers 29 and 31, and is then pulled by rollers 21 and 22 described above with reference to FIG. 6. FIG. 8 shows a cross-section VIII—VIII of the mechanism shown in FIG. 7. The unwanted portion 30 is shown being pulled vertically upward near the edge of the belt 7. The unwanted portion 30 separates very readily from the material being processed because the material directly under the belt 7 is very hot, either in a liquid or near-liquid state. FIG. 9 shows an enlarged view of how the unwanted material portion 30 is peeled away from the material being processed, and FIG. 10 is a top view thereof. The unwanted portion 30 is shown pulled slightly aside for clarity. It may be pulled parallel with the material being processed, or slightly aside, or at a much wider angle than shown. The effect is the same; the material being processed is left with a very smooth finished edge.

A further modification of the present invention is to make the drum 1 fixed, and to only rotate the buffer 4. This modification requires making the buffer 4 of a more rigid material than required in the previously described embodiment, so that the buffer will have the required structural rigidity so as to be rotatable relative to the drum 1. While this modification would not provide as efficient cooling as in the case when the drum is rotating, the use of such a modification with a stationary electrode 3 below the rotating buffer 4, is still clearly within the present inventive concept. In most cases, however, it is desirable to rotate the drum 1 and the buffer 4 together.

As mentioned above, various conventional devices for use with the present invention to provide the pressure of the belt 7 against the drum buffer 4, to provide movement of the belt, to provide rotation of the drum, and to mount the various elements relative to each other, are not shown herein so as not to unduly obscure the invention. These are conventional means and it should be clear to one ordinarily skilled in the art how to implement the present invention, especially in view of prior U.S. Pat. No. 3,162,561.

While the invention has been described above with respect to a specific embodiment, it should be clear that various modifications and alterations can be made thereto within the scope of the accompanying claims.

What is claimed is:

1. In a dielectric heat sealing apparatus comprising:
a drum having a generally circular circumference and having a central axis;
a drum buffer at least partially axially overlaying the circumference of said drum; and
a movable metallic belt pressed against said drum buffer over a predetermined portion thereof to press a workpiece to be sealed between said metallic belt and said drum buffer;
the improvement wherein:
said drum buffer has an electrically insulating surface and is spaced from said drum over at least a continuous circumferential portion of said drum;
a metallic electrode is interposed in said space between said drum buffer and the surface of said drum;
means is provided for applying high frequency voltage between said metallic belt and said metallic electrode; and
means is provided for rotating said drum buffer about said axis of said drum.

2. Apparatus according to claim 1 wherein rotating means simultaneously rotates both said drum and said drum buffer.

3. Apparatus according to claim 1 wherein said drum buffer is attached to said drum and said rotating means is coupled to said drum to rotate said drum and said drum buffer concurrently therewith.

4. Apparatus according to claim 3 wherein said drum has a slippery insulating surface.

5. Apparatus according to claim 2 wherein said drum has a slippery insulating surface.

6. Apparatus according to claim 5 wherein said surface of said drum is integral with said drum.

7. Apparatus according to claim 5 wherein said surface of said drum is a separate slippery, insulating material layer attached to said drum.

8. Apparatus according to claim 5 wherein said drum surface is polytetrafluoroethylene impregnated fiberglass.

9. Apparatus according to claim 3 wherein said drum buffer it attached to said drum on the peripheral surface of said drum.

10. Apparatus according to claim 9 wherein said drum buffer is secured to said drum peripheral surface continuously around a circumferential portion of said drum surface.

11. Apparatus according to claim 1 wherein said drum buffer is comprised of polytetrafluoroethylene impregnated fiberglas.

12. Apparatus according to claim 1 wherein said drum is comprised of insulating material.

13. Apparatus according to claim 1 wherein said metallic electrode is stationary relative to the axis of said drum.

14. Apparatus according to claim 2 wherein: said drum and drum buffer have slippery insulating surfaces facing said metallic electrode; and said metallic electrode is stationary relative to the axis of said drum.

15. Apparatus according to claim 1 wherein said means for applying said high frequency voltage includes a high frequency voltage generator means coupled to said metallic electrode; and means for coupling said metallic belt to ground potential.

16. Apparatus according to claim 1 wherein said high frequency voltage is radio frequency voltage.

17. Apparatus according to claim 1 wherein said drum buffer is coextensive with the peripheral surface of said drum.

18. Apparatus according to claim 1 wherein said metallic belt is pressed against said drum buffer overlying and in registration with said metallic electrode.

19. Apparatus according to claim 3 wherein said drum buffer is secured to said drum at a position spaced from the contact area between said drum buffer and said movable metallic belt.

20. Apparatus according to claim 1 including means for cooling and movable metallic belt.

21. Apparatus according to claim 1 wherein said metallic belt includes a non-metallic covering thereon.

22. Apparatus according to claim 21 wherein said non-metallic belt covering has a pattern embossed so as to imprint said pattern on the material being processed.

23. Apparatus accordingly to claim 1 wherein said metallic belt is comprised of a plurality of short length segments coupled together.

24. Apparatus according to claim 23 wherein said metallic belt includes means for flexibly connecting said belt segments together.

25. Apparatus according to claim 23 wherein said metallic belt comprises a plurality of chain-link elements hingedly coupling adjacent belt segments together.

26. Apparatus according to claim 23 wherein said belt segments have a curvature corresponding to the curvature of the surface of said drum.

27. Apparatus according to claim 23 wherein said belt segments have a surface matching the profile of the material being processed.

28. Apparatus according to claim 1 wherein said belt has a pattern therein.

29. Apparatus according to claim 28 wherein said belt pattern comprises a plurality of holes of a predetermined shape formed therein.

30. Apparatus according to claim 1 including means for pressing said metallic belt against said drum buffer with different pressures along the contact area between said belt and said drum buffer.

31. Apparatus according to claim 30 wherein said pressing means includes at least one additional pressure roller pressing said belt against said drum buffer.

32. Apparatus according to claim 30 wherein said pressing means includes at least one additional belt pressing said metallic belt against said drum buffer over a given portion of said contact area between said metallic belt and said buffer.

33. Apparatus according to claim 1 comprising at least one auxiliary roller spaced from said drum adjacent the output of the material being processed for engaging and carrying the processed material away from said drum.

34. Apparatus according to claim 33 including a pair of driven auxiliary rollers for engaging the processed material therebetween.

35. Apparatus according to claim 1 comprising at least one further roller for engaging, drawing off from the drum and carrying away an unwanted portion of the material being processed.

36. Apparatus according to claim 35 wherein said at least one further roller is spaced from said drum and is located such that such unwanted portion is drawn off from the drum before the end of contact between said metallic belt and said drum.

37. Apparatus according to claim 35 comprising at least one auxiliary roller spaced from said drum adjacent the output of the material being processed for engaging and carrying the processed material away from said drum.

38. Apparatus according to claim 37 wherein said unwanted portion is also engaged by said at least one auxiliary roller after said unwanted portion leaves engagement with said at least one further roller.

39. Apparatus according to claim 1 wherein said drum buffer is completely comprised of insulating material.

40. Apparatus according to claim 1 wherein: said drum buffer has a slippery insulating surface facing said metallic electrode; said metallic electrode is fixed; and said drum buffer bears against, and is movable relative to, said fixed metallic electrode during a heat sealing operation.

References Cited
UNITED STATES PATENTS

| | | | |
|---|---|---|---|
| 3,162,561 | 12/1964 | Farkas | 156—380 |
| 3,556,887 | 1/1971 | Adcock et al. | 156—380 |
| 2,903,546 | 9/1959 | O'Mara | 156—272 |
| 2,910,723 | 11/1959 | Traver | 156—272 |
| 3,461,017 | 8/1969 | Fecher et al. | 156—380 |

CHARLES E. VAN HORN, Primary Examiner

F. FRISENDA, JR., Assistant Examiner

U.S. Cl. X.R.

156—582